(12) United States Patent
Li et al.

(10) Patent No.: US 11,940,337 B2
(45) Date of Patent: Mar. 26, 2024

(54) PRESSURE SENSING DEVICE, PRESSURE SENSING METHOD AND ELECTRONIC TERMINAL WITH COMPACT STRUCTURE AND HIGH SENSITIVITY

(71) Applicant: SHENZHEN NEW DEGREE TECHNOLOGY CO., LTD., Guangdong (CN)

(72) Inventors: Hao Li, Guangdong (CN); Xuepeng Lin, Guangdong (CN)

(73) Assignee: SHENZHEN NEW DEGREE TECHNOLOGY CO., LTD., Shenzhen (CN)

( * ) Notice: Subject to any disclaimer, the term of this patent is extended or adjusted under 35 U.S.C. 154(b) by 250 days.

(21) Appl. No.: 17/416,384

(22) PCT Filed: Dec. 20, 2018

(86) PCT No.: PCT/CN2018/122314
§ 371 (c)(1),
(2) Date: Jun. 18, 2021

(87) PCT Pub. No.: WO2020/124477
PCT Pub. Date: Jun. 25, 2020

(65) Prior Publication Data
US 2022/0057277 A1    Feb. 24, 2022

(51) Int. Cl.
*G01L 1/18*    (2006.01)
(52) U.S. Cl.
CPC ....................... *G01L 1/18* (2013.01)
(58) Field of Classification Search
CPC ....... G01L 9/0052; G01L 1/18; G01L 1/2287; G01L 1/2293; G01L 1/2262; G01L 1/205
See application file for complete search history.

(56) References Cited

U.S. PATENT DOCUMENTS 4,317,126 A  *  2/1982  Gragg, Jr. ............... H01L 29/84
                                                    257/419
4,456,901 A  *  6/1984  Kurtz ...................... H01L 29/84
                                                    257/419
(Continued)

FOREIGN PATENT DOCUMENTS

CN    102901845 A    1/2013
CN    105748078       7/2016
(Continued)

OTHER PUBLICATIONS

International Search Report for PCT/CN2018/122314 dated Sep. 17, 2019, 6 pages.
(Continued)

*Primary Examiner* — Tran M. Tran
(74) *Attorney, Agent, or Firm* — NIXON & VANDERHYE, P.C.

(57) ABSTRACT

The pressure sensing device includes a substrate and a pressure sensor. The pressure sensor used is a thin-film piezoresistive sensor with a certain area, and a power wire, a ground wire, and two differential wires are led out from ends of the pressure sensor respectively, and the pressure sensor is arranged on the substrate. The substrate is simply attached to the object being tested that is to be subjected to pressure, the pressure sensor is connected to a pressure sensing detection circuit, the object being tested deforms under pressure, and the thin-film piezoresistive sensor deforms as the substrate deforms. The deformation of the substrate is detected through detecting the voltage drop between the two differential wires, which is converted to obtain the pressure on the object being tested, thereby realizing a pressure-sensitive touch function. A pressure sensing method and an electronic terminal with the pressure sensing device are also provided.

19 Claims, 4 Drawing Sheets

(56) References Cited

U.S. PATENT DOCUMENTS

| | | | | | |
|---|---|---|---|---|---|
| 4,481,497 | A | * | 11/1984 | Kurtz | G01L 9/0055 73/756 |
| 4,739,381 | A | * | 4/1988 | Miura | G01L 9/0052 257/469 |
| 5,488,350 | A | * | 1/1996 | Aslam | H01L 23/3732 219/541 |
| 6,608,370 | B1 | * | 8/2003 | Chen | H01L 21/67132 257/668 |
| 7,963,171 | B2 | * | 6/2011 | Gregory | G01M 5/0083 73/777 |
| 8,109,149 | B2 | * | 2/2012 | Kotovsky | G01L 1/18 73/777 |
| 8,525,279 | B2 | * | 9/2013 | Gowrishetty | G01L 1/2293 257/419 |
| 8,982,081 | B2 | * | 3/2015 | Li | G06F 3/045 345/173 |
| 9,171,965 | B2 | * | 10/2015 | Takenaka | G01L 9/06 |
| 9,665,199 | B2 | * | 5/2017 | Li | H03K 17/965 |
| 10,241,607 | B2 | * | 3/2019 | Leng | G01L 1/18 |
| 10,248,255 | B2 | * | 4/2019 | Lu | G06F 3/0412 |
| 10,288,498 | B2 | * | 5/2019 | Taguchi | G01L 1/2243 |
| 10,379,654 | B2 | * | 8/2019 | Li | G01B 7/18 |
| 10,401,241 | B2 | * | 9/2019 | Madden | G06F 3/04144 |
| 10,444,091 | B2 | * | 10/2019 | Hu | G06F 3/04144 |
| 10,508,958 | B2 | * | 12/2019 | Tanaka | G01L 1/18 |
| 10,663,358 | B2 | * | 5/2020 | Madden | G01L 11/00 |
| 10,816,416 | B2 | * | 10/2020 | Li | G01L 1/18 |
| 10,899,604 | B2 | * | 1/2021 | Brandl | G01L 1/2293 |
| 10,935,443 | B2 | * | 3/2021 | Li | G01L 1/14 |
| 11,150,074 | B2 | * | 10/2021 | Li | G01L 1/20 |
| 11,162,851 | B2 | * | 11/2021 | Li | G06F 3/0445 |
| 11,177,059 | B2 | * | 11/2021 | Milke | H01C 10/10 |
| 11,248,967 | B2 | * | 2/2022 | Li | G01B 7/18 |
| 11,783,627 | B2 | * | 10/2023 | Dagdeviren | G06V 40/174 382/103 |
| 2011/0094676 | A1 | * | 4/2011 | Husemann | B32B 37/10 156/306.6 |
| 2012/0241822 | A1 | * | 9/2012 | Takenaka | G01L 9/0055 257/254 |
| 2020/0118719 | A1 | * | 4/2020 | Milke | H01C 17/0652 |
| 2021/0181042 | A1 | * | 6/2021 | Chu | H01L 29/84 |
| 2021/0293633 | A1 | * | 9/2021 | Li | G01L 1/2262 |

FOREIGN PATENT DOCUMENTS

| | | |
|---|---|---|
| CN | 105784214 | 7/2016 |
| CN | 106301324 | 1/2017 |
| CN | 107003198 | 8/2017 |
| CN | 107247531 A | 10/2017 |
| CN | 206818338 | 12/2017 |
| CN | 108204870 A | 6/2018 |
| CN | 108446043 | 8/2018 |

OTHER PUBLICATIONS

International Search Report for PCT/CN2018/122314 dated Sep. 17, 2019, 3 pages.

Yu et al., "Research and Design of a Novel Island Membrane Pressure Sensor", Micronanoelectronic Technology, Jul. 31, 2015, vol. 52, No. 7, pp. 446-451 (7 total pages).

Office Action issued in CN201880100307.5, dated Oct. 30, 2023, 7 pages.

* cited by examiner

PRESSURE SENSING DEVICE, PRESSURE SENSING METHOD AND ELECTRONIC TERMINAL WITH COMPACT STRUCTURE AND HIGH SENSITIVITY

CROSS REFERENCE TO RELATED APPLICATIONS

This application is a National Stage of PCT Application No. PCT/CN2018/122314 filed on Dec. 12, 2018, the content of which is incorporated herein by reference thereto.

TECHNICAL FIELD

The present application relates to the field of pressure sensing technologies, and relates to a pressure sensing device, a pressure sensing method using the pressure sensing device, and an electronic terminal with the pressure sensing device.

BACKGROUND

A pressure sensor is s device that is capable of sensing a pressure signal, and converting the pressure signal into an available output electrical signal in a specified rule. At present, the pressure sensor devices in the market are mainly formed by a strain gauge, such as a typical electronic scale which requires a relatively large space but is provided with low sensitivity.

Technical Problem

A purpose of the present application is to provide a pressure sensing device, a pressure sensing method and an electronic terminal, so as to solve the technical problem that the pressure sensing devices in the prior art require a relatively large space but are provided with low sensitivity.

SUMMARY

Embodiments of the present application provide a pressure sensing device, which includes a substrate attached to an object being tested, and a pressure sensor provided on the substrate; wherein the pressure sensor includes at least one thin-film piezoresistive sensor and at least four signal wires respectively led out from four corners of the thin-film piezoresistive sensor, a side of the thin-film piezoresistive sensor is attached to the substrate, and resistivity distribution of the thin-film piezoresistive sensor changes with deformation of the substrate when the substrate deforms, wherein one opposing pair of the signal wires comprises one power wire and one ground wire respectively, and another opposing pair of the signal wires comprises differential wires, and pressure on the object being tested is detected through detecting voltage drop between the two differential wires.

Embodiments of the present application provide a pressure sensing method, which uses the above-mentioned pressure sensing device, and includes following steps of:

attaching the substrate to the object being tested;

making the thin-film piezoresistive sensor equivalent to a first equivalent circuit, wherein the first equivalent circuit comprises a bridge circuit provided with two pairs of bridge arms, a first resistor connected between the two differential wires, and a second resistor connected between the power wire and the ground wire, two ends of the bridge circuit are respectively connected to the power wire and the ground wire, and another two ends of the bridge circuit are respectively connected to the two differential wires;

deleting the second resistor since the second resistor in the first equivalent circuit has hardly little influence on signal quantities, to obtain a second equivalent circuit, wherein the second equivalent circuit comprises a bridge circuit provided with two pairs of bridge arms, and a first resistor connected between the two differential wires, wherein two ends of the bridge circuit are respectively connected to the power wire and the ground wire, and another two ends of the bridge circuit are respectively connected to the two differential wires;

making a triangle-shaped circuit composed of the first resistor and the two bridge arms connected to the power wire in the second equivalent circuit equivalent to a Y-shaped circuit to obtain a third equivalent circuit;

obtaining a voltage equation of a center point of the Y-shaped circuit and a voltage equation of the two differential wires according to Kirchhoff's law; further, obtaining a voltage drop equation between the two differential wires; obtaining deformation of the substrate through conversion of the voltage drop equation, and obtaining pressure on the object being tested through conversion.

Embodiments of the present application provide an electronic terminal, which includes an object being tested, the above-mentioned pressure sensing device, and a pressure sensing detection circuit electrically connected to the pressure sensor, wherein the substrate is attached to the object being tested.

BENEFICIAL EFFECTS

The pressure sensor used is the thin-film piezoresistive sensor with a certain area, the power wire, the ground wire, and the two differential wires are led out from the ends of the thin-film piezoresistive sensor, and the pressure sensor is provided on the substrate. The pressure sensor is provided with advantages such as small area, small initial pressure difference, high sensitivity, small temperature drift, strong anti-interference ability, high anti-drop coefficient, and stable reliability etc. The substrate is simply attached to the object being tested which is to be subjected to pressure, the pressure sensor is connected to the pressure sensing detection circuit, the object being tested deforms under pressure, and the thin-film piezoresistive sensor deforms with the deformation of the substrate 10. The deformation of the substrate is detected through detecting the voltage drop $\Delta V$ between the two differential wires, which is converted to obtain the pressure on the object being tested, thereby realizing a pressure-sensitive touch function. Both the pressure sensing method using the pressure sensing device, and the electronic terminal with the pressure sensing device can realize the pressure-sensitive touch function.

DESCRIPTION OF THE DRAWINGS

In order to illustrate the technical solutions in the embodiments of the present application more comprehensively, the drawings needed to be used in the description for the embodiments or the prior art will be briefly introduced below. Obviously, the drawings in the following description are merely some embodiments of the present application, and other drawings may be obtained by those of ordinary skill in the art based on these drawings without creative labor.

EMBODIMENTS OF THE PRESENT APPLICATION

In order to make the technical problem, technical solutions, and beneficial effects to be solved by the present application more comprehensible, the present application will be further described in detail below with reference to the accompanying figures and embodiments. It should be understood that the specific embodiments described herein are only used to explain the present application, but not to limit the present application.

In the description of the embodiments of the present application, it should be understood that orientations or positional relations indicated by terms, such as "length", "width", "upper", "lower", "front", "rear", "left", "right", "vertical", "horizontal", "top", "bottom", "inner", "outer" and the like, are based on the orientations or positional relations as shown in the figures, which are only to facilitate description of the embodiments of the present application and simplification of the description, but not to indicate or imply that a specified device or element must be provided with a specific orientation, be constructed and operated in a specific orientation. Therefore, the orientations or positional relations cannot be understood as a limitation to the embodiments of the present application.

In addition, the terms "first" and "second" are only used for descriptive purposes, and cannot be understood as an indication or implication of relative importance or an implicit indication of the number of an indicated technical feature. As such, the features defined with "first" and "second" may explicitly or implicitly include one or more of these features. In the description of the present application, "plurality" means two or more, unless otherwise specifically defined.

In the embodiments of the present application, unless otherwise clearly specified and defined, the terms "mounting", "connection", "engagement", "fixing" and the like should be understood in a broad sense. For example, the connection may be fixed connection or detachable connection, or one-piece; the connection may be mechanical connection or electrical connection; the connection may be direct connection or indirect connection through an intermediate medium, or may be internal communication of two elements or interaction relationship between two elements. For those of ordinary skill in the art, the specific meanings of the above-mentioned terms in the embodiments of the present application can be understood according to specific conditions.

Figure 1:
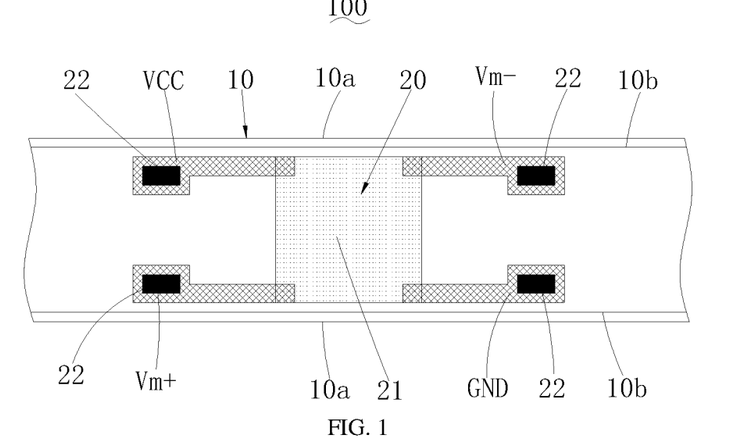
FIG. 1 is a front view of a pressure sensing device provided by an embodiment of the present application.
Figure 2:
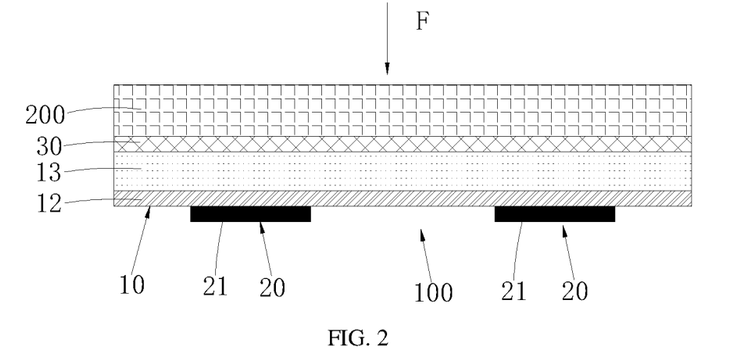
FIG. 2 is a cross-sectional view of an electronic terminal provided by an embodiment of the present application.
Figure 3:
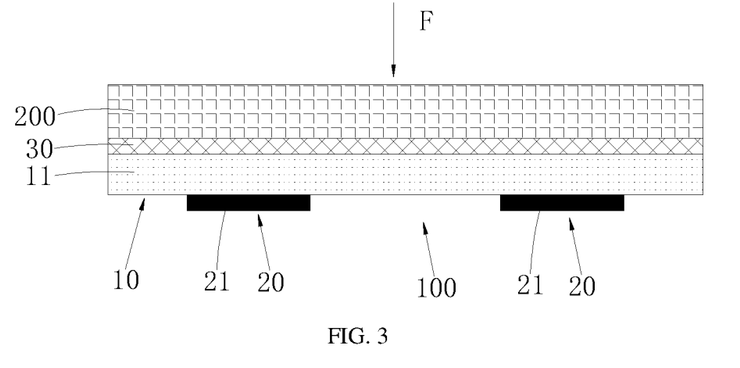
FIG. 3 is a cross-sectional view of an electronic terminal provided by another embodiment of the present application.

Please refer to FIGS. 1 to 3, an embodiment of the present application provides a pressure sensing device 100. The pressure sensing device 100 includes a substrate 10 attached to an object 200 being tested, and a pressure sensor 20 provided on the substrate 10. The pressure sensor 20 includes at least one thin-film piezoresistive sensor 21 and at least four signal wires respectively led out from four corners of the thin-film piezoresistive sensor 21. One side of the thin-film piezoresistive sensor 21 is attached to the substrate 10, and resistivity distribution of the thin-film piezoresistive sensor 21 changes with the deformation when the substrate 10 deforms, here one opposing pair of signal wires includes one power wire VCC and one ground wire GND, and another opposing pair of signal wires includes differential wires Vm+ and Vm−. The pressure on the object 200 being tested is detected through detecting voltage drop ΔV between the two differential wires Vm+ and Vm−.

The pressure sensor 20 used is the thin-film piezoresistive sensor 21 with a certain area, the power wire VCC, the ground wire GND, and the two differential wires Vm+ and Vm− are led out from the ends of the thin-film piezoresistive sensor 21, and the pressure sensor 20 is provided on the substrate 10. The pressure sensor 20 is provided with advantages such as small area, small initial pressure difference, high sensitivity, small temperature drift, strong anti-interference ability, high anti-drop coefficient, and stable reliability etc. The substrate 10 is simply attached to the object 200 being tested which is to be subjected to pressure, the pressure sensor 20 is connected to a pressure sensing detection circuit, the object 200 being tested deforms under pressure, and the thin-film piezoresistive sensor 21 deforms with the deformation of the substrate 10. The deformation of the substrate 10 is detected through detecting the voltage drop ΔV between the two differential wires Vm+ and Vm−, which is converted to obtain the pressure of the object 200 being tested, thereby realizing a pressure-sensitive touch function.

The object 200 being tested may be a panel or one side of a mobile phone or the like. The substrate 10 is provided as long stripe-shaped, and the pressure sensor 20 is provided on the substrate 10, which can reduce material consumption. The long stripe-shaped substrate 10 has two outer edges 10a and two inner edges 10b located inside the two outer edges 10a. The thin-film piezoresistive sensor 21 of the pressure sensor 20, the signal wires and bonding pads 22 at the ends of the signal wires are located within an area between the two inner edges 10b, as such the structure is compact. The substrate 10 is a circuit board, and the pressure sensor 20 is mounted on the circuit board, which is easy to assemble, and it is convenient for the thin-film piezoresistive sensor 21 to deform with the deformation of the substrate 10. The circuit board is provided with circuit traces connected with the pressure sensing detection circuit to perform signal processing, thereby realizing pressure touch.

The pressure sensor 20 may be an NDT pressure sensor. The thin-film piezoresistive sensor 21 of the pressure sensor 20 is a one-piece structure with a certain area. When a force acts on the object 200 being tested, curvature of the thin-film piezoresistive sensor 21 in its longitudinal direction increases due to influence of a tangential strain force, and the curvature of the thin-film piezoresistive sensor 21 in its transversal direction changes insignificantly. According to characteristics (i.e., the resistance characteristics) of the pressure sensor 20, the resistance value increases as the curvature of the resistor increases, and the resistance value decreases as the curvature of the resistor decreases. The object 200 being tested deforms when subjected to pressure, and the thin-film piezoresistive sensor 21 deforms as the substrate 10 deforms. The voltage drop ΔV between the two differential wires Vm+ and Vm− is used as a signal, and the pressure on the object 200 being tested is obtained through data processing on the voltage drop ΔV by the pressure sensing detection circuit.

The pressure sensing device 100 may be made relatively small, compact in structure, and may be applied to different pressure sensing occasions. For example, the width of the pressure sensing device 100 may be 2 mm or larger than 2 mm.

Further, as a specific implementation of the pressure sensing device 100 provided by the present application, one pressure sensors 20 is provided; and when used in multichannels, at least two pressure sensors 20 are provided, and the pressure sensors 20 are arranged as an array or distributed unevenly. The pressure sensing device 100 is long stripe-shaped, which will undergo one-dimensional deformation after subjected to pressure.

Further, as a specific implementation of the pressure sensing device 100 provided by the present application, the thin-film piezoresistive sensor 21 may be a strain sensor involving in any type, including polycrystalline semiconductor materials or amorphous semiconductor materials, polycrystalline silicon, graphene, copper-nickel alloy, carbon nanotubes, thin metal wires, and conductor-insulator composite materials, etc. All of the afore-mentioned solutions can achieve pressure sensing.

Further, as a specific implementation of the pressure sensing device 100 provided by the present application, the thin-film piezoresistive sensor 21 is a pressure sensor with a certain area, which may have a shape such as regular polygon, variation polygon, ellipse, circle, and the like. All of the afore-mentioned solutions can achieve pressure sensing. The present application is illustrated by taking a square resistor as an example.

Further, referring to FIG. 3, as a specific embodiment of the pressure sensing device 100 provided by the present application, the substrate 10 is a printed circuit board 11, the ends of the four signal wires are connected to the printed circuit board 11, and the pressure sensor 20 is printed on the printed circuit board 11. The printed circuit board 11 may be a paper substrate, a metal substrate, a composite substrate, a glass fiber cloth substrate, a ceramic substrate, or the like. Alternatively, referring to FIG. 2, the substrate 10 includes a flexible circuit board 12 and a reinforcing sheet 13 provided on the flexible circuit board 12, and the ends of the four signal wires are connected to the flexible circuit board 12. The pressure sensor 20 is printed on the flexible circuit board 12. The reinforcing sheet 13 may be a stainless steel sheet, a glass fiber epoxy copper-clad sheet (FR-4), an aluminum sheet or other materials provided with certain rigidity. The above two solutions are both easy to assemble, and are convenient for the thin-film piezoresistive sensor 21 to deform with the deformation of the substrate 10, which can be selected according to needs.

Further, referring to FIG. 1, as a specific implementation of the pressure sensing device 100 provided by the present application, the signal wires may be various conductors, for example, metals such as Cu (copper), Ni (nickel), Ag (silver), Au (Gold) etc., or metal compounds, or may also be C (carbon) powder or conductive nanotubes, or may be oxide powder etc. The above-mentioned structure is easy to mold, and it is convenient to connect the four ends of the thin-film piezoresistive sensor 21 to the circuit board.

Further, referring to FIGS. 2 and 3, as a specific implementation of the pressure sensing device 100 provided by the present application, a side of the substrate 10 facing away from the pressure sensor 20 is provided with an adhesive 30 for bonding with the object being tested 200. The use of the adhesive 30 facilitates the assembly of the pressure sensing device 100 against the surface of the object 200 being tested. The adhesive 30 may be VHB tape or other adhesives.

Further, as a specific implementation of the pressure sensing device 100 provided by the present application, the width of the pressure sensing device 100 is greater than or equal to 1 mm. The pressure sensing device 100 may be applied to occasions where the space is relatively small (less than 1 mm).

Further, referring to FIG. 1, as a specific implementation of the pressure sensing device 100 provided by the present application, one of the sides of the thin-film piezoresistive sensor 21 is parallel to an arrangement direction of the pressure sensor 20. This structure is compact and occupies a small space. The thin-film piezoresistive sensor 21 may be equivalent to the following first equivalent circuit, second equivalent circuit, and third equivalent circuit, and longitudinal directions of bridge arms Rm1 and Rm2 in the first equivalent circuit are parallel to the arrangement direction of the sensor 20, and longitudinal directions of bridge arms Rf1 and Rf2 are perpendicular to the arrangement direction of the pressure sensors 20.

Further, as a specific implementation of the pressure sensing device 100 provided by the present application, a deformation direction of the pressure sensor 20 is parallel to the longitudinal direction of the pressure sensing device 100. The pressure sensing device 100 is long stripe-shaped, and will undergo one-dimensional deformation after subjected to pressure. The thin-film piezoresistive sensor 21 may be equivalent to the following first equivalent circuit, second equivalent circuit, and third equivalent circuit. The longitudinal directions of the signal wires are parallel to the arrangement direction of the pressure sensors 20. This structure is compact and occupies a small space.

Figure 4:
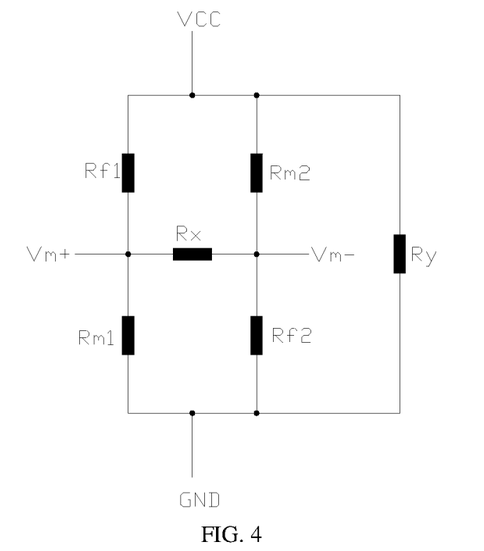
FIG. 4 is a first equivalent circuit diagram of a thin-film piezoresistive sensor applied in the pressure sensing device of FIG. 1.
Figure 5:
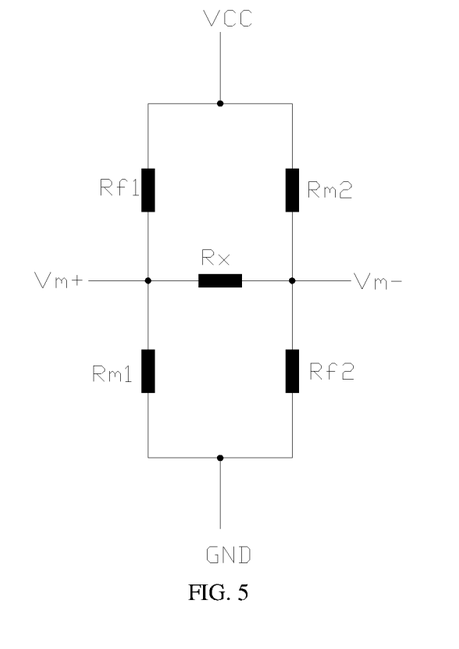
FIG. 5 is a second equivalent circuit diagram equivalently obtained from the first equivalent circuit of FIG. 4.
Figure 7:
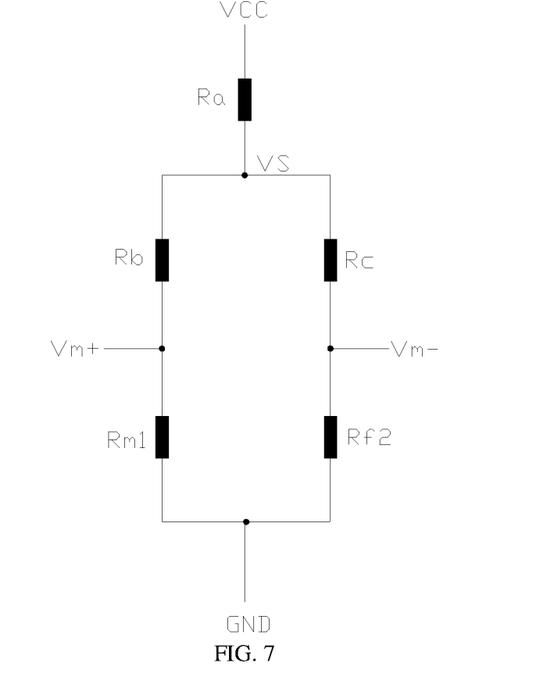
FIG. 7 is a third equivalent circuit diagram equivalently obtained from the second equivalent circuit of FIG. 5.

Referring to FIGS. 1 to 3, an embodiment of the present application provides a pressure sensing method, which adopts the pressure sensing device 100 of any of the above embodiments, and includes the following steps of:

attaching the substrate 10 to the object 200 being tested;

leading out the four wires from the four corners of the thin-film piezoresistive sensor 21, here each two of the wires is provided with a certain impedance, and making the thin-film piezoresistive sensor 21 equivalent to a first equivalent circuit (as shown in FIG. 4), here the first equivalent circuit includes a bridge circuit with two pairs of bridge arms, a first resistor Rx connected between the two differential wires Vm+ and Vm−, and a second resistor Ry connected between the power wire VCC and the ground wire GND, two ends of the bridge circuit are respectively connected to the power wire VCC and the ground wire GND, and another two ends of the bridge circuit are respectively connected to the two differential wires Vm+ and Vm−;

here resistance value change of the second resistor Ry will not affect voltage values of Vm+ and Vm−, and difference between signal quantities indicated by Vm+ and Vm−, which is convenient for calculation and has hardly little influence on the signal quantities; deleting the second resistor Ry in the first equivalent circuit to obtain the second equivalent circuit (as shown in FIG. 5), here the second equivalent circuit includes the bridge circuit with two pairs of bridge arms, and the first resistor Rx connected between the two differential wires Vm+ and Vm−, two ends of the bridge circuit are respectively connected to the power wire VCC and the ground wire GND, and the another two ends of the bridge circuit are respectively connected to the two differential wires Vm+ and Vm−;

here in the first equivalent circuit, the voltage drop ΔV between the two differential wires Vm+ and Vm− is used as one signal, and the second resistor Ry is connected between the power wire VCC and the ground wire GND; since the signal is equal to potential difference between the two differential wires Vm+ and Vm−, the change of the resistance value of the second resistor Ry does not affect the signal, therefore, the second resistor Ry may be deleted and thus the first equivalent circuit may be equivalent to the second equivalent circuit;

making a triangle-shaped circuit composed of the first resistor Rx and the two bridge arms Rf1 and Rm2 connected to the power wire VCC in the second equivalent circuit equivalent to a Y-shaped circuit to obtain the third equivalent circuit (as shown in FIG. 7);

obtaining a voltage equation of a center point of the Y-shaped circuit and a voltage equation of the two differential wires Vm+ and Vm− according to Kirchhoff's law; further, obtaining a voltage drop equation between the two differential wires Vm+ and Vm−; obtaining deformation of the substrate 10 through conversion of the voltage drop equation, and obtaining the pressure of the object 200 being tested through conversion.

The width of the pressure sensing device 100 may be 2 mm or larger. The pressure sensor 20 used is a thin-film piezoresistive sensor 21 with a certain area, and the power wire VCC, the ground wire GND and the two differential wires Vm+ and Vm− are led out from the ends of the thin-film piezoresistive sensor 21 respectively, and the pressure sensor 20 is provided on the substrate 10. The pressure sensor 20 has the advantages such as small area, small initial pressure difference, high sensitivity, small temperature drift, strong anti-interference ability, high anti-drop coefficient, and stable reliability etc. The substrate 10 is simply attached to the object 200 being tested that is to be subjected to pressure, the pressure sensor 20 is connected to the pressure sensing detection circuit, the object 200 being tested deforms when subjected to pressure, and the thin-film piezoresistive sensor 21 deforms as the substrate 10 deforms. Through detecting the voltage drop ΔV between the two differential wires Vm+ and Vm−, the deformation of the substrate 10 is detected, and the pressure on the object 200 being tested is obtained through conversion, so as to realize the pressure-sensitive touch function. The pressure sensing method using the pressure sensing device 100 can realize the pressure-sensitive touch function.

Further, as a specific implementation of the pressure sensing method provided by the present application, the thin-film piezoresistive sensor 21 is a square resistor, and the resistance values of the respective bridge arms (Rf1, Rf2, Rm1, Rm2) are equal, that is, Rf1=Rm1=Rm2=Rf2; the resistance value of the first resistor Rx is equal to the resistance value of the second resistor Ry, that is, Rx=Ry; these are obtained based on the symmetry of the resistors. It is understandable that, the thin-film piezoresistive sensor 21 may also be other shape such as regular polygon, variation polygon, ellipse, circle, or the like, and all these structures can perform pressure sensing by adopting the above-mentioned pressure sensing method.

Further, as a specific implementation of the pressure sensing method provided by the present application, please refer to FIG. 4, in the first equivalent circuit, regarding the two pairs of bridge arms of the bridge circuit, one pair of bridge arms are denoted as Rf1 and Rf2, and another pair of bridge arms are denoted as Rm1, Rm2, the first resistor is denoted as Rx, and the second resistor is denoted as Ry; the longitudinal directions of the bridge arms Rm1 and Rm2 are parallel to the arrangement direction of the pressure sensor 20, and the longitudinal directions of the bridge arms Rf1 and Rf2 are perpendicular to the arrangement direction of the pressure sensor 20.

Please refer to FIG. 7, the three equivalent resistors of the Y-shaped circuit in the third equivalent circuit are denoted as Ra, Rb, and Rc respectively. Through comparing voltage-current relationships of the triangle-shaped circuit and the Y-shaped circuit, the following may be obtained:

$$Ra = \frac{Rf1 * Rm2}{Rf1 + Rm2 + Rx};$$

$$Rb = \frac{Rf1 * Rx}{Rf1 + Rm2 + Rx};$$

$$Rc = \frac{Rm2 * Rx}{Rf1 + Rm2 + Rx}.$$

According to the Kirchhoff's law, the following equation is obtained:

the voltage equation at the center point of the Y-shaped circuit is:

$$VS = VCC * \frac{\frac{(Rb + Rm1)(Rc + Rf2)}{Rb + Rm1 + Rc + Rf2}}{Ra + \frac{(Rb + Rm1)(Rc + Rf2)}{Rb + Rm1 + Rc + Rf2}};$$

the voltage equation of one differential wire Vm+ is:

$$Vm+ = \frac{VS * Rm1}{Rb + Rm1};$$

the voltage equation of another differential wire Vm− is:

$$Vm- = \frac{VS * Rf2}{Rc + Rf2};$$

and the voltage drop equation between the two differential wires Vm+ and Vm− is:

$$\Delta V = (Vm+) - (Vm-) = \frac{(Rm1Rm2 - Rf1Rf2)Rx * VCC}{Rm1Rm2Rx + Rf1Rm2(Rm1 + Rx) +}$$
$$Rf2Rm1(Rm2 + Rx) +$$
$$Rf1Rf2(Rm1 + Rm2 + Rx)$$

In the above voltage drop equation, there are multiple variables such as Rm1, Rm2, Rf1, and Rf2. In order to study the influence of each variable on the voltage drop ΔV, the partial derivatives of the voltage drop ΔV relative to the respective variables are calculated below, and the monotonicity of each variable on the voltage drop ΔV is considered.

(1) Obtain the partial derivative of ΔV with respect to Rm1:

$$\partial[\Delta V, Rm1] = \frac{Rf1\ (Rf2+Rm2)\ Rx\ [Rf1Rf2 + Rm2\ Rx + Rf2\ (Rm2+Rx)]VCC}{\{Rm1\ [Rm2Rx + Rf2\ (Rm2+Rx)] + Rf1\ [Rm2(Rm1+Rx) + Rf2\ (Rm1+Rm2+Rx)]\}^2}$$

∵ ∂[ΔV, Rm1] is a positive number.

∴ The function of ΔV with respect to Rm1 is monotonically increasing.

(2) Obtain the partial derivative of ΔV with respect to Rm2:

$$\partial[\Delta V, Rm2] = \frac{Rf2\ (Rf1+Rm1)\ Rx\ [Rm1Rx + Rf1\ (Rf2+Rm2+Rx)]VCC}{\{Rm1\ [Rm2Rx + Rf2\ (Rm2+Rx)] + Rf1\ [Rm2(Rm1+Rx) + Rf2\ (Rm1+Rm2+Rx)]\}^2}$$

∵ ∂[ΔV, Rm2] is a positive number.

∴ The function of ΔV with respect to Rm2 is monotonically increasing.

(3) Obtain the partial derivative of ΔV with respect to Rf1:

$$\partial[\Delta V, Rf1] = -\frac{Rm1\ (Rf2+Rm2)\ Rx\ [Rm2(Rm1+Rx) + Rf2\ (Rm2+Rx)]VCC}{\{Rm1\ [Rm2Rx + Rf2\ (Rm2+Rx)] + Rf1\ [Rm2(Rm1+Rx) + Rf2\ (Rm1+Rm2+Rx)]\}^2}$$

∵ ∂[ΔV, Rf1] is a negative number.

∦ The function of ΔV with respect to Rf1 is monotonically decreasing.

(4) Obtain the partial derivative of ΔV with respect to Rf2:

$$\partial[\Delta V, Rf2] = -\frac{(Rf1+Rm1)\ Rm2\ Rx\ [Rf1\ (Rm1+Rx) + Rm1\ (Rm2+Rx)]VCC}{\{Rm1\ [Rm2Rx + Rf2\ (Rm2+Rx)] + Rf1\ [Rm2(Rm1+Rx) + Rf2\ (Rm1+Rm2+Rx)]\}^2}$$

∵ [ΔV, Rf2] is a negative number.

∦ The function of ΔV with respect to Rf2 is monotonically decreasing.

Referring to FIGS. 1 to 3, when the force F acts on the object 200 being tested, the curvature of the thin-film piezoresistive sensor 21 in the longitudinal direction increases due to the influence of the tangential strain force, and the curvature of the thin-film piezoresistive sensor 21 in the transversal direction changes insignificantly. According to the characteristics of the pressure sensor 20, the resistance value increases as the curvature of the thin-film piezoresistive sensor 21 becomes larger; and the resistance value decreases as the curvature of the thin-film piezoresistive sensor 21 becomes smaller. The object 200 being tested deforms when subjected to pressure, and the thin-film piezoresistive sensor 21 deforms with the deformation of the substrate 10.

Figure 6:
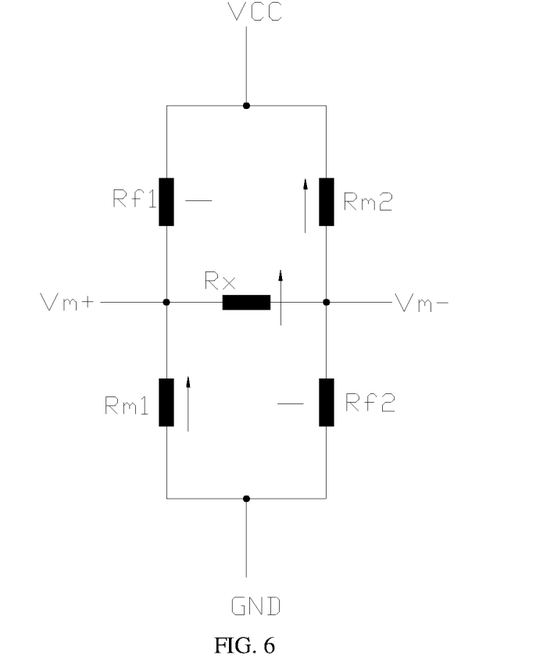
FIG. 6 is a diagram showing equivalent resistance value changes of the second equivalent circuit of FIG. 5 after pressed by an object being tested.

The longitudinal directions of the bridge arms Rm1 and Rm2 are parallel to the arrangement direction of the pressure sensors 20, and the longitudinal directions of the bridge arms Rf1 and Rf2 are perpendicular to the arrangement direction of the pressure sensors 20. FIG. 6 is a diagram of the equivalent resistance change of the second equivalent circuit after the object 200 being tested is pressed.

According to symmetry, suppose that the resistance change of Rm1 and Rm2 are both ΔR1, and the resistance change of Rx is ΔR2. Since the curvatures of Rf1 and Rf2 change very little, it is assumed here that Rf1 and Rf2 remain unchanged.

It can be seen from the above that the relationship between the voltage drop ΔV (signal) between the two differential wires Vm+ and Vm− and the resistance values of the bridge is:

$$\Delta V = (Vm+) - (Vm-) = \frac{(Rm1Rm2 - Rf1Rf2)Rx * VCC}{Rm1Rm2Rx + Rf1Rm2(Rm1+Rx) + Rf2Rm1(Rm2+Rx) + Rf1Rf2(Rm1+Rm2+Rx)},$$

and the function of ΔV with respect to Rm1 and the function of ΔV with respect to Rm2 are both monotonically increasing.

The above voltage drop equation also includes a variable of Rx, and the change of Rx has a very small effect on the voltage drop ΔV.

Figure 8:
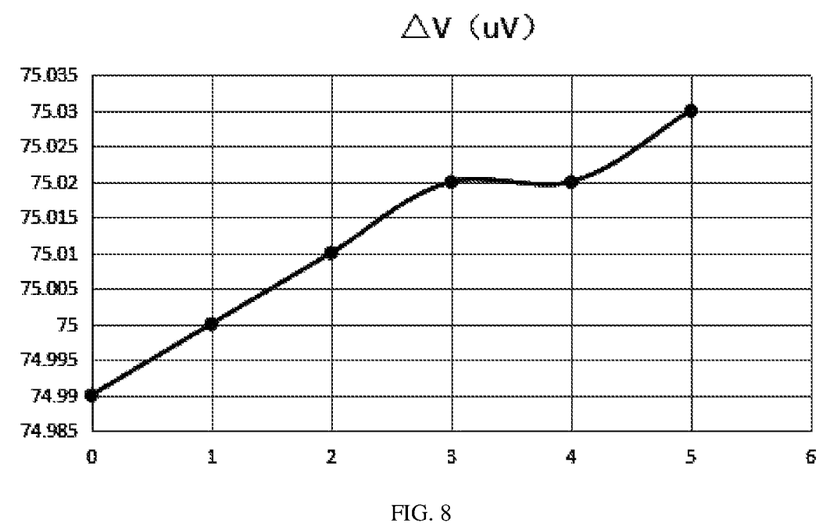
FIG. 8 is a simulation diagram of voltage drop between two differential wires when a first resistor Rx changes.

It is verified by simulation below that the change of Rx has a very small effect on the voltage drop ΔV. Take an example, during pressing, set Rf1=Rf2=5 kΩ, Rm1=Rm2=5000.5Ω, Rx increases from 5 k with 1Ω as a step, the curve of ΔV through the simulation is as shown in FIG. 8, where the horizontal axis indicates the resistance value (the unit is Ω). In the above example, when the resistance value of Rx changes by one-thousandth, the change of ΔV does not exceed one-thousandth. Simulations of Rx are performed with other resistance values, which show very little influence on ΔV. It can be seen that the change amount caused by the pressure change effect Rx has a very small effect on ΔV.

Figure 9:
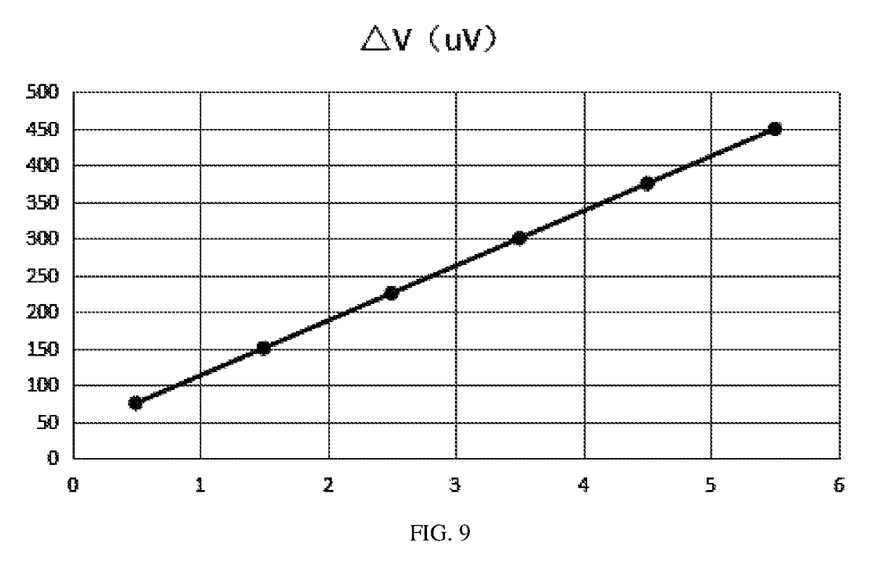
FIG. 9 is a simulation diagram of voltage drop between two differential wires when bridge arms Rm1 and Rm2 change.

It is verified by simulation below that the increasing resistance values of Rm1 and Rm2 can make the voltage drop ΔV increase monotonically. Set Rf1=Rf2=5 kΩ, Rm1 and Rm2 are both increased by a resistance value of 0.5Ω, and the curve of ΔV can be obtained by simulation as shown in FIG. 9, where the horizontal axis indicates the resistance value (the unit is Ω). It can be seen that the increasing resistance values of Rm1 and Rm2 due to the pressure change effect can make ΔV increase monotonically.

Therefore, when a force is applied to the pressure sensing device 100, Rm1 and Rm2 become larger, and when Rf1 or Rf2 are basically unchanged, the signal ΔV will increase in a positive direction. Moreover, the greater the applied force, the greater the signal ΔV, and pressure touch control can be realized after signal processing.

Referring to FIGS. 1 to 3, an embodiment of the present application provides an electronic terminal, which includes the object 200 being tested, the pressure sensing device 100 of any of the above embodiments, and the pressure sensing detection circuit electrically connected to the pressure sensor 20, and the substrate 10 is attached to the object 200 being tested.

The width of the pressure sensing device 100 may be 2 mm or larger. The pressure sensor 20 used is a thin-film piezoresistive sensor 21 with a certain area, and the power wire VCC, the ground wire GND and the two differential wires Vm+ and Vm− are led out from the ends of the thin-film piezoresistive sensor 21 respectively, and the pressure sensor 20 is provided on the substrate 10. The pressure sensor 20 has the advantages such as small area, small initial pressure difference, high sensitivity, small temperature drift, strong anti-interference ability, high anti-drop coefficient, and stable reliability etc. The substrate 10 is simply attached to the object 200 being tested that is to be subjected to pressure, the pressure sensor 20 is connected to the pressure sensing detection circuit, the object 200 being tested deforms when subjected to pressure, and the thin-film piezoresistive sensor 21 deforms as the substrate 10 deforms. Through detecting the voltage drop ΔV between the two differential wires Vm+ and Vm−, the deformation of the substrate 10 is detected, and the pressure on the object 200 being tested is obtained through conversion, so as to realize the pressure-sensitive touch function. The electronic terminal with the pressure sensing device 100 can realize the pressure-sensitive touch function.

The pressure sensing detection circuit serves as a signal processing circuit, which analyzes and processes the electrical signal from the pressure sensor 20 and transmits it to a main controller of the electronic terminal together with touch position information detected by a panel. In this way, the precise pressure of the touch can be obtained while identifying the touch position.

The pressure sensing detection circuit is configured to detect the electrical signal obtained by a pressure sensing component, and configured to process and analyze the electrical signal. The thin-film piezoresistive sensor 21 of the pressure sensor 20 is connected to the pressure sensing detection circuit through a signal wire, of course, the signal wire only describes a method of connecting the thin-film piezoresistive sensor 21 to the pressure sensing detection circuit. As other embodiments, the pressure sensor 20 may also be directly or indirectly electrically connected to the detection circuit in other ways.

The pressure sensing detection circuit may be used as a control center, which receives control information transmitted by the pressure sensor 20, and then controls the electronic terminal. The pressure sensing detection circuit is usually described as a combination of hardware and software provided with multiple processing methods. The hardware and software are configured to communicate the control information input by the pressure sensor 20 with a system associated with a customer through feedback and perform additional associated tasks or functions.

The pressure sensing detection circuit may be implemented as a general-purpose processor, a content addressable memory, a digital signal processor, a digital-to-analog switch, a programmable logic device, a discrete hardware assembly or other combinations; at the same time, algorithm and software information related to the pressure touch screen/pressure sensing system is embedded in its interior.

The hardware and software in the pressure sensing detection circuit are configured to perform a variety of functions, technologies, feedback, and processing tasks associated with the client system.

Further, as a specific implementation of the electronic terminal provided by the present application, the object 200 being tested is a panel or a frame. The pressure-sensitive touch function of the panel or frame is realized.

The above description only describes preferred embodiments of the present application, which are not intended to limit the present application. Any modification, equivalent replacement and improvement etc. made within the spirit and principle of the present application shall be included within the protection scope of the present application.

What is claimed is:

1. A pressure sensing device, comprising:
   a substrate configured for attachment to an object being tested, the substrate being shaped as a long strip having two outer edges and two inner edges located inside the two outer edges, an area being defined between the two inner edges, and
   a pressure sensor provided on the substrate in an arrangement direction;
   wherein the pressure sensor comprises:
      at least one thin-film piezoresistive sensor disposed on the substrate, the at least one thin-film piezoresistive sensor haivng sides and four corners, and
      first, second, third and fourth signal wires respectively led out from the four corresponding corners of the thin-film piezoresistive sensor, wherein a side of the thin-film piezoresistive sensor is attached to the substrate, and resistivity distribution of the thin-film piezoresistive sensor changes with deformation of the substrate when the substrate deforms, wherein the first and second signal wires comprise one power wire and one ground wire respectively, and the third and fourth signal wires opposing the first and second signal wires comprise differential signal wires indicating, a pressure on the object being tested by a voltage drop therebetween;
   wherein the thin-film piezoresistive sensor, the first, second, third and fourth signal wires and bonding pads terminating the first, second, third and fourth signal wires are disposed within the area defined between the two inner edges of the substate; and
   wherein a side of the thin-film piezoresistive sensor is parallel to the arrangement direction of the pressure sensor and the first, second, third and fourth signal wires each longitudinally extend parallel to the arrangement direction of the pressure sensor.

2. The pressure sensing device of claim 1, wherein the pressure sensing device comprises at least two pressure arranged as an array or distributed unevenly.

3. The pressure sensing device of claim 1, wherein the thin-film piezoresistive sensor comprises at least one a polycrystalline semiconductor material, an amorphous semiconductor material, polycrystalline silicon, graphene, a copper-nickel alloy, a carbon nanotube, a thin metal wire, and/or a conductor-insulator composite material; and/or
   the signal wires comprises at least one material of a metal, a metal compound, carbon powder, a conductive nanotube, and/or oxide powder.

4. The pressure sensing device of claim 1, wherein the thin-film piezoresistive sensor has a shape of a regular polygon or an irregular polygon.

5. The pressure sensing device of claim 1, wherein the substrate comprises a printed circuit board, and the bonding pads of the first, second, third and fourth signal wires are each connected to the printed circuit board.

6. The pressure sensing device of claim 5, wherein the printed circuit board comprises a paper substrate, a metal substrate, a composite substrate, a glass fiber cloth substrate and/or a ceramic substrate.

7. The pressure sensing device of claim 1, wherein the substrate comprises a flexible circuit board and a reinforcing sheet arranged on the flexible circuit board, and the bonding pads of the first, second, third and fourth signal wires are connected to the flexible circuit board.

8. The pressure sensing device of claim 7, wherein the reinforcing sheet comprises a stainless steel sheet, a glass fiber epoxy resin copper-clad sheet, and/or an aluminum sheet.

9. The pressure sensing device of claim 1, wherein a side of the substrate facing away from the pressure sensor is provided with an adhesive for bonding with the object being tested.

10. The pressure sensing device of claim 1, wherein the pressure sensing device has a widht greater than or equal to 1 mm.

11. The pressure sensing device of claim 1, wherein a deformation direction of the pressure sensor is parallel to a longitudinal direction of the pressure sensing device.

12. The pressure sensing device of claim 1 wherein the at least one thin-film piezoresistive sensor forms a Y circuit between the first, third and fourth signal wires.

13. A pressure sensing method, performed by a pressure sensing device comprising:
a substrate attached to an object being tested, and p1 a pressure sensor, provided on the substrate, and comprising at least one thin-film piezoresistive sensor and at least four signal wires respectively led out from four corners of the thin-film piezoresistive sensor;
wherein a side of the thin-film piezoresistive sensor is attached to the substrate, and resistivity distribution of the thin-film piezoresistive sensor changes with deformation of the substrate when the substrate deforms, wherein one opposing pair of the at least four signal wires comprises one power wire and one ground wire respectively, and another opposing pair of the at least four signal wires comprises two differential wires; wherein the substrate is in a long strip shape, the long stripe-shaped substrate has two outer edges and two inner edges located inside the two outer edges, the thin-film piezoresistive sensor of the pressure sensor, the at least four signal wires and bonding pads at ends of the at least four wires are located within an area between the two inner edges; wherein one of sides of the thin-film piezoresistive sensor is parallel to an arrangement direction of the pressure sensor, and longitudinal directions of the at least four signal wires are parallel to the arrangement direction of the pressure sensor;
wherein the method comprises;
attaching the substrate to the object being tested;
making the thin-film piezoresistive sensor equivalent to a first equivalent circuit, wherein the first equivalent circuit comprises a bridge circuit provided with two pairs of bridge arms, a first resistor connected between the two differential wires, and a second resistor connected between the power wire and the ground wire, two ends of the bridge circuit are respectively connected to the power wire and the ground wire, and another two ends of the bridge circuit are respectively connected to the two differential wires;
deleting the second resistor, to obtain a second equivalent circuit, wherein the second equivalent circuit comprises a bridge circuit provided with two pairs of bridge arms, and a first resistor connected between the two differential wires, wherein two ends of the bridge circuit are respectively connected to the power wire and the ground wire, and another two ends of the bridge circuit are respectively connected to the two differential wires;
making a triangle-shaped circuit composed of the first resistor and the two pairs of bridge arms connected to the power wire in the second equivalent circuit equivalent to a Y-shaped circuit to obtain a third equivalent circuit;
obtaining a voltage a center point of the Y-shaped circuit and a voltage of the two differential wires according to Kirchhoff's law; obtaining a voltage drop between the two differential wires; obtaining deformation of the substrate through conversion of the voltage drop, and obtaining a pressure on the object being tested through conversion;
wherein in the first equivalent circuit, regarding the two pairs of bridge arms of the bridge circuit, one pair of the bridge arms are denoted as Rf1 and Rf2, and another pair of the bridge arms are denoted as Rm1 and and Rm2, the first resistor is denoted as Rx, and the second resistor is denoted as Ry; longitudinal directions of the bridge arms Rm1 and Rm2 are parallel to an arrangement direction of the pressure sensor, and longitudinal directions of the bridge arms Rf1 and Rf2 are perpendicular to the arrangement direction of the pressure sensor;
wherein three equivalent resistors of the Y-shaped circuit in the third equivalent circuit are denoted as Ra, Rb, and Rc respectively;

$$Ra = \frac{Rf1 * Rm2}{Rf1 + Rm2 + Rx};$$

$$Rb = \frac{Rf1 * Rx}{Rf1 + Rm2 + Rx};$$

$$Rc = \frac{Rm2 * Rx}{Rf1 + Rm2 + Rx};$$

the voltage at the center point of the Y-shaped circuit is calculated by:

$$VS = VCC * \frac{\frac{(Rb+Rm1)(Rc+Rf2)}{Rb+Rm1+Rc+Rf2}}{Ra + \frac{(Rb+Rm1)(Rc+Rf2)}{Rb+Rm1+Rc+Rf2}};$$

the voltage of one of the differential wires is calculated by:

$$Vm += \frac{VS * Rm1}{Rb + Rm1};$$

the voltage of another one of the differential wires is calculated by:

$$Vm -= \frac{VS * Rf2}{Rc + Rf2};$$

and the voltage drop between the two differential wires is calculated by:

$$\Delta V = (Vm+) - (Vm-) = \frac{(Rm1Rm2 - Rf1Rf2)Rx * VCC}{Rm1Rm2Rx + Rf1Rm2(Rm1 + Rx) + Rf2Rm1(Rm2 + Rx) + Rf1Rf2(Rm1 + Rm2 + Rx)}.$$

14. The pressure sensing method of claim 13, wherein the thin-film piezoresistive sensor is a square resistor, resistance values of the respective bridge arms are equal, and a resistance value of the first resistor is equal to a resistance value of the second resistor.

15. An electronic terminal, comprising an object being tested, a pressure sensing device, and a pressure sensing detection circuit;
   wherein the pressure sensing device comprises:
   a substrate attached to the object being tested, and
   a pressure sensor, provided on the substrate, and comprising at least one thin-film piezoresistive sensor and at least four signal wires respectively led out from four corners of the thin-film piezoresistive sensor;
   wherein a side of the thin-film piezoresistive sensor is attached to the substrate, and resistivity distribution of the thin-film piezoresistive sensor changes with deformation of the substrate when the substrate deforms, wherein one opposing pair of the at least four signal wires comprises one power wire and one ground wire respectively, and another opposing pair of the at least four signal wires comprises differential wires;
   wherein the pressure sensing detection circuit is electrically connected to the pressure sensor, and the substrate is attached to the object being tested;
   wherein the substrate is in a long strip shape, the long stripe-shaped substrate has two outer edges and two inner edges located inside the two outer edges, the thin-film piezoresistive sensor of the pressure sensor, the at least four signal wires and bonding pads at ends of the at least four signal wires are located within an area between the two inner edges;
   wherein one of sides of the thin-film piezoresistive sensor is parallel to an arrangement direction of the pressure sensor; and
   wherein longitudinal directions of the at least four signal wires are parallel to the arrangement direction of the pressure sensor.

16. The electronic terminal of claim 15, wherein the object being tested is a panel or a frame.

17. The electronic terminal of claim 15, wherein the substrate is a printed circuit board, and ends of the four signal wires are connected to the printed circuit board.

18. The electronic terminal of claim 15, wherein the substrate comprises a flexible circuit board and a reinforcing sheet arranged on the flexible circuit board, and ends of the four signal wires are connected to the flexible circuit board.

19. The electronic terminal of claim 15, wherein a side of the substrate facing away from the pressure sensor is provided with an adhesive for bonding with the object being tested.

* * * * *